July 9, 1929.  J. B. VERNAY  1,720,156

FILTERING DRUM

Filed Jan. 13, 1928

Inventor:
Jean Baptiste Vernay
By
Attorney.

Patented July 9, 1929.

1,720,156

UNITED STATES PATENT OFFICE.

JEAN BAPTISTE VERNAY, OF VILLEURBANNE, FRANCE.

FILTERING DRUM.

Application filed January 13, 1928, Serial No. 246,510, and in Germany January 18, 1927.

My invention refers to filtering drums comprising a filtering cloth or the like wrapped around a drum.

Beneath this cloth, spaces are provided which are connected during the rotation of the drum alternately to a pump or other low-pressure apparatus, whereby filtered liquid is drawn through the cloth, the solid matter being deposited onto the same in the form of a "cake", and then to a compressed air line whereby the cake is removed from the filtering cloth.

When compressed air is applied to a sector of the drum, the filtered liquid contained in the spaces beneath the cloth is expelled through the same and is collected together with the cake. This, of course, is a serious drawback as the cake must be extremely dry.

My invention has for its object to reduce this inconvenience to a considerable extent by reducing the capacity of the spaces beneath the cloth.

In the filtering drum according to this invention, said spaces are formed by parallel grooves, connected together by a channel which is itself connected to the pipe leading to the distributing gear.

The drum comprises elements 1 which are made of any suitable material such as wood for instance. These elements are in the form of blocks united together by means of semi-circular bolts 2, and the two semi-cylindrical units or members thus produced are in turn united by ordinary bolts 3. The drum is supported by suitable radial spokes 4.

Figure 2:
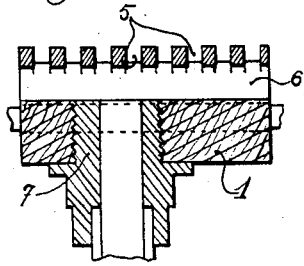
Fig. 2 is an enlarged cross-section of an element.
Figure 3:
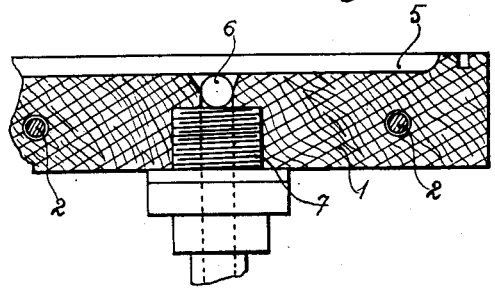
Fig. 3 is a longitudinal section of the same.

The outer surface of each element 1 is provided with parallel grooves 5 (Figs. 2 and 3) which do not open through the sides of the element. A channel 6, perpendicular to the grooves 5, and disposed inward of the plane thereof, (see Fig. 6) connects the grooves of an element together.

A radial pipe 7 opens into the bottom of channel 6 (Figs. 2 and 3), this pipe leading to the distributing gear (not illustrated).

Figure 1:
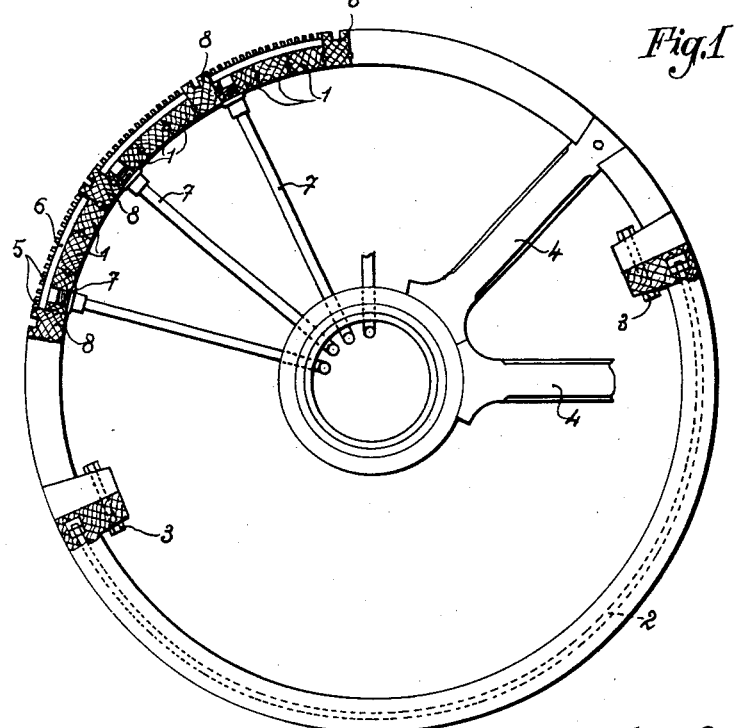
Fig. 1 is an end view with parts in section.

In order to avoid a too great number of radial pipes 7, three elements 1 are placed directly side by side, their channels 6 registering endwise as clearly shown in Fig. 1; and the sector thus formed is separated from the adjacent ones by solid blocks 8.

The drum according to my invention is simple and cheap in construction; it may easily be made of wood, a material which is proof against a great number of industrial liquids. Moreover, the spaces under the cloth are reduced to a considerable extent and the volume of liquid expelled with the cake is thus also reduced to a negligible value.

Of course, the grooves 5 could be formed by means of parallel wooden laths, the ends of the spaces thus created being closed by any suitable means. Said grooves might be divergent instead of parallel.

I claim:

1. A filter, comprising a drum around which the filtering cloth is to be wrapped, said drum being divided into independent sectors each comprising a plurality of individual blocks, each block having a set of grooves in its outer surface and a single channel cross-connecting such grooves and disposed inwardly of the plane thereof, the channels of any two successive blocks registering endwise; separating means between the successive sectors; means for uniting the sectors together to form the drum; and a radial pipe individual to each sector, said pipe opening into the channel of one of the blocks forming the sector and leading from said block to the distributing gear.

2. A filter according to claim 1, in which the separating means between successive sectors comprises a solid member inserted between the last block of one sector and the first of the other sector; said members preventing communication between the registering channels of the two sectors.

3. A filter according to claim 1 in which the means for uniting together the sectors constituting the drum comprise arcuate bolts driven through the elements of a number of said sectors and uniting the same so as to form an arcuate multi-sector unit; and means for fastening together said arcuate units.

4. A filter according to claim 1 in which the means for uniting together the sectors constituting the drum comprise semi-circular bolts driven through the elements of one half of the number of said sectors and uniting the same so as to form two semi-cylindrical members; and means for uniting together said semi-cylindrical members.

5. A filter comprising a drum around which the filtering cloth is to be wrapped, said drum consisting of a plurality of independent sectors each embodying a set of individual elements having grooves in their outer surfaces and connections between the grooves; arcuate bolts driven through the elements of a number of sectors and uniting the same so as to form an arcuate multi-sector unit; means for fastening said units together; and a pipe connection between each individual sector and the distributing gear.

6. A filter comprising a drum around which the filtering cloth is to be wrapped, said drum consisting of a plurality of independent sectors each embodying a set of individual elements having grooves in their outer surfaces and connections between the grooves; semi-circular bolts driven through the elements of half the number of sectors and uniting the same so as to form two semi-cylindrical units; means for fastening said units together; and a pipe connection between each individual sector and the distributing gear.

7. A filter according to claim 5, in which the connections between the grooves of a sector consist of registering cross-channels in the elements of the sector; and in which the pipe connection between each individual sector and the distributing gear consists of a single radial pipe that opens at one end into the channel of one element of the sector and leads therefrom to said gear.

8. A filter according to claim 6, in which the connections between the grooves of a sector consist of registering cross-channels in the elements of the sector; and in which the pipe connection between each individual sector and the distributing gear consists of a single radial pipe that opens at one end into the channel of one element of the sector and leads therefrom to said gear.

9. A filter comprising a drum around which the filtering cloth is to be wrapped, said drum consisting of a plurality of independent sectors each embodying a set of individual blocks having grooves in their outer surfaces, each block having a single channel cross-connecting the grooves of that block and disposed inwardly of the plane of said grooves, the channels of the blocks of each sector registering with one another to form a single long channel which is devoid of communication with the corresponding long channels of adjacent sectors; means for connecting the sectors together; and a pipe connection between the long channel of each individual sector and the distributing gear.

10. A filter comprising a drum around which the filtering cloth is to be wrapped, said drum consisting of a multiplicity of individual blocks arranged in definite groups, each block having a set of grooves in its outer surface and a single channel cross-connecting the grooves and disposed inwardly of the plane thereof, the channels of the blocks of each group registering endwise to form a single long channel individual to that group; and a pipe connection between each such long channel and the distributing gear.

In testimony whereof I affix my signature.

JEAN BAPTISTE VERNAY.